United States Patent [19]

van Lier et al.

[11] 3,957,696

[45] May 18, 1976

[54] TERNARY SOLID IONICALLY CONDUCTIVE COMPOSITIONS AND METHOD OF PREPARING THE SAME

[75] Inventors: Johannes A. van Lier, Cleveland; Kathleen K. Maszczynski, Parma Heights, both of Ohio

[73] Assignee: Union Carbide Corporation, New York, N.Y.

[22] Filed: Nov. 7, 1973

[21] Appl. No.: 413,713

Related U.S. Application Data

[63] Continuation-in-part of Ser. No. 210,143, Dec. 20, 1971, abandoned.

[52] U.S. Cl............................... 252/518; 423/383
[51] Int. Cl.² ..................... H01B 1/06; H01C 1/06
[58] Field of Search........... 252/518; 136/83 R, 153; 423/383

[56] References Cited

UNITED STATES PATENTS

| | | | |
|---|---|---|---|
| 3,519,404 | 7/1970 | Argue et al. | 252/518 |
| 3,582,291 | 6/1971 | Mellors | 423/383 |
| 3,723,185 | 3/1973 | Mellors | 423/383 |

*Primary Examiner*—Leland A. Sebastian
*Assistant Examiner*—Josephine Lloyd
*Attorney, Agent, or Firm*—Cornelius F. O'Brien

[57] ABSTRACT

Ternary compositions in the system $MAg(CN)_2$—MI—AgI wherein M may be potassium or rubidium or mixtures thereof have good ionic conductivity. Eutectic compositions in the molar proportions $KAg(CN)_2$—3KI—5AgI and $RbAg(CN)_2$—5.4RbI—9.6AgI exist and make preparation of compositions in the system possible at temperatures generally below about 250°C.

10 Claims, 1 Drawing Figure

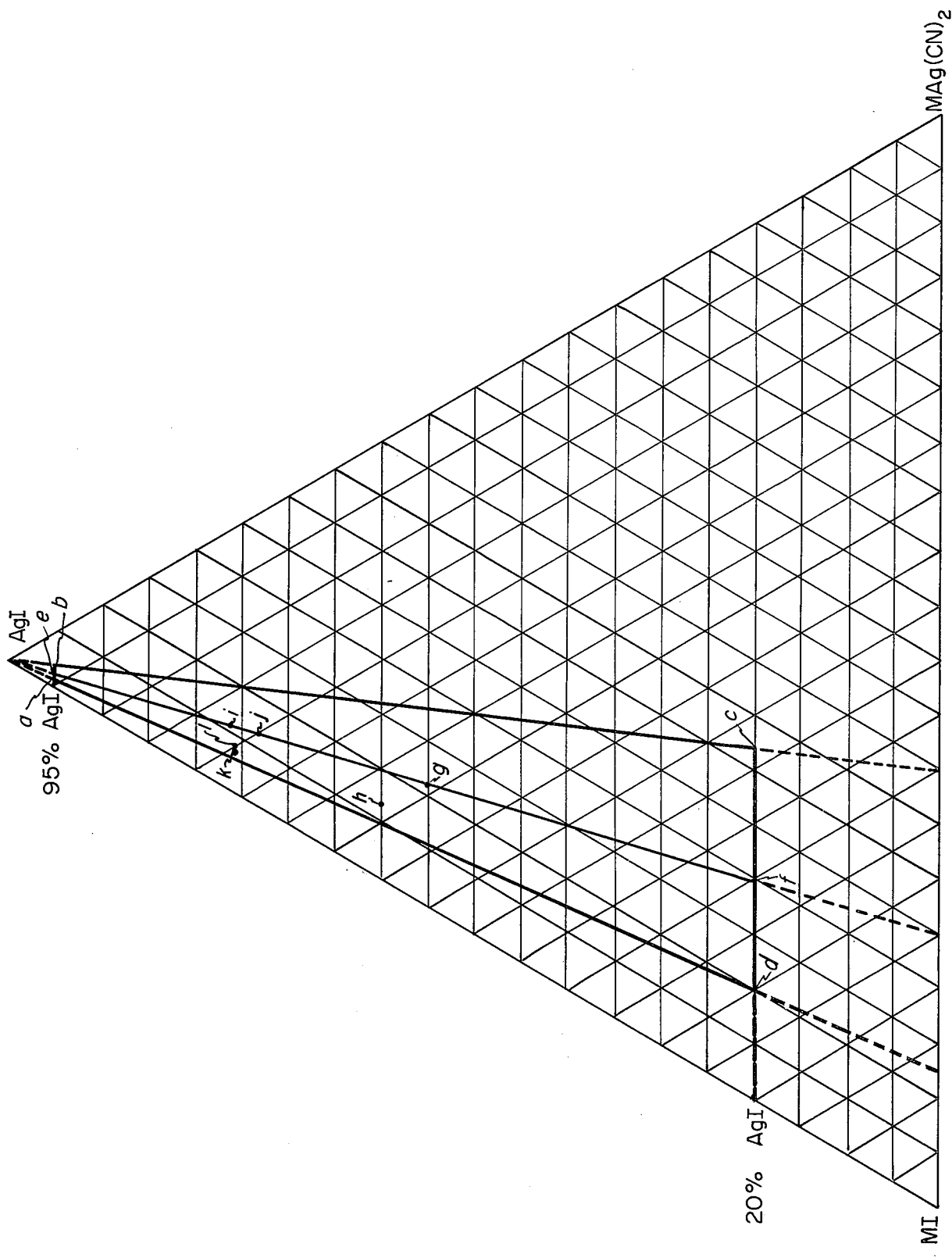

TERNARY SOLID IONICALLY CONDUCTIVE COMPOSITIONS AND METHOD OF PREPARING THE SAME

This application is a continuation-in-part of application Ser. No. 210,143 filed December 20, 1971, now abandoned.

The invention relates to solid ionic conductors and refers more particularly to ternary solid conductors in the system $MAg(CN)_2$—MI—AgI and to a method of preparing them.

Recent work in the field of solid ionic conductors has produced materials having conductivities hig enough to make them useful in a number of solid state electrochemical devices including batteries, coulometers, and computer elements. Argue and Owens in U.S. Pat. No. 3,443,997 disclose one such composition, the binary material represented as $MAg_4I_5$, M being either potassium, rubidium, ammonium ($NH_4$) or cesium or mixtures thereof. Mellors in U.S. Pat. No. 3,582,291 and U.S. Pat. No. 2,723,185 discloses a composition represented as MCN—4AgI and xAgI—yMCN—zAgCN,; wherein M is potassium, rubidium or cesium or mixtures thereof, $x$ ranges from 0.45 to 0.95 mole, $y$ is 1 minus $x$ mole and the ratio of $y/z$ ranges from infinity to 1, or wherein $x$ ranges from 0.45 to 0.95 mole, $z$ is 1 minus $x$ mole and the ratio of $y/z$ ranges from 1 to 1/9. All of the above patents disclose compositions having good conductivities. However, the materials in the $MAg_4I_5$ group have a tendency to thermodynamic instability at temperatures below about 20° to 30°C. The materials in the MCN—4AgI group and xAgI—yMCN—zAgCN group, while of greater stability, are prepared at quite high temperatures, of the order of 400° to 500°C., as disclosed in the Mellors patents. Heating at such temperatures is not only expensive but even more important may lead to decomposition of some constituents.

The present invention has for its principal object the provision of a stable, ionically conducting solid which can be prepared at relatively low temperatures, i.e., below about 250°C. Another important object of the invention is a method of preparing at low temperatures solid compositions having ionic conductivities greater than $1 \times 10^{-2}$ $ohm^{-1}$ $cm^{-1}$ at room temperature and which compositions are thermodynamically stable.

The invention, by means of which these objects are attained, comprises ternary compositions in the system represented by the notation $MAg(CN)_2$—AgI—MI, wherein M is potassium, rubidium or mixtures thereof. The invention also comprises a method for producing such compositions which is based upon the discovery of low melting eutectic compositions in the system which permit the preparation of a number of specific compositions by heating the constituents together at a relatively low temperature, that is, below about 250°C. The melting point of the eutectic compositions is below the decomposition point of desirable conducting compositions and, therefore, such compositions are of great practical value for use in battery applications or the like.

The compositions of the invention are more specifically defined as being ternary, containing 20% to 95% (molar percentages) silver iodide (AgI), the remainder being MI and $MAg(CN)_2$, M being potassium or rubidium or mixtures of these alkali metals and the molar proportion of MI to $MAg(CN)_2$ being greater than 1.5 to 1.0 and less than 7 to 1. A preferred ratio of MI to $MAg(CN)_2$ is 3 to 1. Compositions containing less than 20% silver iodide exhibit very poor conductivity, and compositions containing more than 95% silver iodide also exhibit poor conductivity. Compositions having a molar ratio of less than 1 to 1, as described in the Mellors patents, are prepared at quite high temperatures of the order of 400°C. to 500°C., and thus may lead to decomposition of some constituents. A specific composition, in the potassium system, which has excellent properties is represented by the molar formula $KAg(CN)_2$—3KI—13AgI. In the rubidium system, a specific composition is $RbAg(CN)_2$—3RbI—11AgI.

The ternary eutectic in the system $KAg(CN)_2$—KI—AgI has the composition $KAg(CN)_2$—3KI—5AgI and has a melting point of 200°C. ± 2°. In the rubidium system the ternary eutectic has the composition $RbAg(CN)_2$—5.4RbI—9.6AgI and melts at 176°C. ± 2°. Because of the existence of these eutectics it is possible to produce the compositions of the invention by heating at temperatures not much above the eutectic melting points. This markedly lessens the possibility of decomposition of the materials present in the compositions and of course also provides the general advantages of low temperature heating against high temperature heating.

The composition are prepared by heating their constituents to a temperature below about 250°C. Heating is continued under an inert atmosphere until all reactions are substantially complete. Two routes may be followed, the first involving the preparation of the low melting (below about 215°C.) composition $MAg(CN)_2$—3MI—5AgI and the addition to it of silver iodide followed by further heating, or simply by mixing the constituents of the composition in the desired molar proportions and heating until reaction is substantially complete. The compositions may be made from mixtures of $MAg(CN)_2$, MI and AgI or equivalent mixtures of MI, AgCN and AgI.

A process for preparing solid ionically conductive compositions in accordance with this invention comprises preparing a finely divided mixture in molar proportions of the composition of selected iodide and cyanide; heating the mixture at a temperature below about 250°C. under inert atmosphere to produce at least a partially liquified mass; cooling the mass so produced to solidify the same, finely dividing the cooled mass; and then reheating the finely divided material to a temperature below about 215°C. under inert atmosphere until all reactions are complete.

It is also possible to start with an eutectic composition, or some other composition of the $MAg(CN)_2$—MI—AgI system, whereupon after the initial heat treatment step followed by cooling and finely dividing the solidified mass is completed, additional silver iodide may be added thereto prior to the reheating step so as to produce a composition having desired properties.

The sole drawing shows a ternary phase diagram of the system MI—AgI—$MAg(CN)_2$ wherein the trapezoidal area a-b-c-d defines the boundary of the compositions of the present invention. Line e–f on the ternary diagram defines the preferred compositions of the MI-AgI-$MAg(CN)_2$ system where the molar proportion of MI to $MAg(CN)_2$ is 3 to 1. The ternary eutectic in the system $KAg(CN_2)$—KI—AgI has the composition $KAg(CN)_2$—3KI—5AgI and is designated on the ternary diagram as point g. The ternary eutectic in the system $RbAg(CN)_2$-RbI-AgI has the composition $RbAg(CN)_2$—5.4RbI-9.6AgI and is designated on the ternary diagram as point h. The remaining points on the ternary diagram designate specific compositions in the $MAg(CN)_2$—MI-AgI system which were prepared as illustrated in the following examples.

EXAMPLE I

A finely divided mixture of 1.78 parts by weight of KI, 0.72 part AgCN and 2.51 parts AgI was prepared. It was heated to melting in the range of 205° to 210°C. for two hours. The melt was cooled and reground with an additional 5.02 parts by weight of AgI. This mixture, which yielded a molar proportion of KI to $KAg(CN)_2$ of 3 to 1, was then heated at 205° to 210°C. for 16 hours. The resultant material was cooled. The characteristic yellow color of AgI had substantially disappeared, indicating that there was little excess AgI. The specific conductance of the product was $1.9 \times 10^{-1}$ $ohm^{-1}$ $cm^{-1}$ and is designated as point i on the ternary diagram.

EXAMPLE II

A finely divided mixture containing in parts by weight 2.00 parts KI, 0.81 part AgCN and 8.48 parts AgI was prepared. This mixture yielded a molar proportion of KI to $KAg(CN)_2$ of 3 to 1. Heating at 200°C. for 16 hours under inert atmosphere produced an incomplete reaction. The product was reground and heated at 236°C. for ½ hour, reground and heated at 205° to 210°C. for 16 hours. The product had a specific conductance of $1.9 \times 10^{-1}$ $ohm^{-1}$ $cm^{-1}$ and is designated as point i on the ternary diagram.

EXAMPLE III

A mixture was prepared containing finely divided $KAg(CN)_2$, KI and AgI in the following molar proportions: 1 part $KAg(CN)_2$; 3 parts KI; 13 parts AgI. This mixture yielded a molar proportion of KI to $KAg(CN)_2$ of 3 to 1. The mixture was heated at 235° to 250°C. for 1 hour, cooled and ground. The finely divided mixture was then heated at 200°C. for 16 hours. The product had a specific conductance of $1.8 \times 10^{-1}$ $ohm^{-1}$ $cm^{-1}$ and is designated as point i on the ternary diagram.

From the above three examples we see that different routes may be followed to prepare a composition according to this invention.

EXAMPLE IV

A mixture containing in finely divided from 2.00 parts by weight RbI, 0.63 part AgCN and 6.63 parts AgI was prepared. This mixture yielded a molar proportion of RbI to $RbAg(CN)_2$ of 3 to 1. It was heated to 200°C. for 16 hours. The product had a specific conductance of $1.9 \times 10^{-1}$ $ohm^{-1}$ $cm^{-1}$ and is designated as point i on the ternary diagram.

EXAMPLE V

A finely divided mixture of 6.34 parts by weight of RbI, 2.00 parts AgCN, and 7.02 parts AgI, was heated in inert atmosphere at 197°–200°C. for two hours yielding a generally liquid mixture. The latter was cooled and ground together with an additional 10.52 parts by weight of AgI which yielded a mixture having a molar proportion of RbI to $RbAg(CN)_2$ of 3 to 1. The resulting mixture was reheated at 200°C. for 16 hours. The product had a specific conductance of $2.0 \times 10^{-1}$ $ohm^{-1}$ $cm^{-1}$ and is designated as point j in the ternary diagram.

EXAMPLE VI

A finely divided mixture of 2.00 parts by weight of RbI, 0.42 part AgCN and 6.63 parts AgI, having a molar proportion of RbI to $RbAg(CN)_2$ of 5 to 1, was heated together in inert atmosphere at 220°C. until the mix was generally molten. The melt was cooled, reground, and heated 16 hours at 204°C. The specific conductance of the resulting material was $2.2 \times 10^{-1}$ $ohm^{-1}$ $cm^{-1}$ and is designated as point l on the ternary diagram.

EXAMPLE VII

A finely divided mixture was prepared in the following molar proportions: 6.4 parts RbI, 2 parts AgCN, and 8.6 parts AgI. The mixture was heated in inert atmosphere at 220°C. until the mix was generally molten. The mix was cooled, ground together with an additional 10.7 parts AgI and heated 16 hours at 204°C. This mix yielded a molar proportion of RbI to $RbAg(CN)_2$ of 5.4 to 1. The product produced had a specific conductance of $2.2 \times 10^{-1}$ $ohm^{-1}$ $cm^{-1}$ and is designated as point k on the ternary diagram.

What is claimed is:

1. A solid ionically conductive ternary composition containing 20% to 95% (molar percentage) silver iodide, the remainder being MI and $MAg(CN)_2$ wherein M is potassium or rubidium or mixtures thereof and the molar proportion of MI to $MAg(CN)_2$ is between about 1.5 to 1 and about 7 to 1.

2. The composition as defined by claim 1 in which the molar proportion of MI to $MAg(CN)_2$ is 3 to 1.

3. The solid ionically conductive composition as defined by claim 1 having the approximate molar formula $KAg(CN)_2$—3KI—13AgI.

4. The solid ionically conductive composition as defined by claim 1 having the approximate molar formula $RbAg(CN)_2$—3RbI—11AgI.

5. The solid ionically conductive composition as defined by claim 1 having the approximate molar formula $KAg(CN)_2$—3KI—5AgI.

6. The solid ionically conductive composition as defined by claim 1 having the approximate molar formula $RbAg(CN)_2$—5.4RbI—9.6AgI.

7. A process for producing a solid ionically conductive ternary composition containing 20% to 95% (molar percentage) silver iodide, the remainder being MI and $MAg(CN)_2$ wheren M is potassium or rubidium or mixtures thereof and the molar proportion of MI to $MAg(CN)_2$ is between about 1.5 to 1 and about 7 to 1 which comprises preparing a finely divided mixture in the molar proportions of the composition of the selected iodide an cyanide; heating the mixture at a temperature below about 250°C. under inert atmosphere to produce at least a partially liquified mass; cooling the mass so produced to solidify the same, finely dividing the cooled mass; and then reheating the finely divided material to a temperature below about 215°C. under inert atmosphere until all reactions are complete.

8. The process defined by claim 7 including the steps of mixing the composition of the selected iodide and cyanide substantially in molar proportions of the composition $MAg(CN)_2$—3MI—5AgI and, after cooling and finely dividing the solidified mass, adding additional silver iodide thereto prior to reheating.

9. The process defined by claim 7 including the steps of mixing the composition of the selected iodide and cyanide substantially in molar proportions of the composition KAg(CN)$_2$—3KI—5AgI and, after cooling and finely dividing the solidified mass, adding additional silver iodide thereto prior to reheating.

10. The process defined by claim 7 including the steps of mixing the composition of the selected iodide and cyanide substantially in molar proportions of the composition RbAg(CN)$_2$—5.4RbI—9.6AgI and after cooling and finely dividing the solidified mass, adding additional silver iodide thereto prior to reheating.

* * * * *

PO-1050
(5/69)

UNITED STATES PATENT OFFICE
CERTIFICATE OF CORRECTION

Patent No. 3,957,696        Dated May 18, 1976

Inventor(s) J. A. Van Lier et al

It is certified that error appears in the above-identified patent and that said Letters Patent are hereby corrected as shown below:

Column 1, line 13, the word "hig" should read

-- high --.

Column 1, line 21, "2,723,185" should read

-- 3,723,185 --.

Column 3, line 49, the word "from" should read

-- form --.

Column 4, line 53, the word "an" should read

-- and --.

Signed and Sealed this

Eighteenth Day of October 1977

[SEAL]

Attest:

RUTH C. MASON
*Attesting Officer*

LUTRELLE F. PARKER
*Acting Commissioner of Patents and Trademarks*